United States Patent
Wasserman et al.

(10) Patent No.: US 7,383,214 B1
(45) Date of Patent: Jun. 3, 2008

(54) DYNAMIC EVENT SELECTION FOR FINANCIAL PROCESSING IN A RELATIONAL DATABASE MANAGEMENT SYSTEM

(75) Inventors: Brian J. Wasserman, Escondido, CA (US); George R. Hood, Poway, CA (US); Thomas K. Ryan, Valley Center, CA (US)

(73) Assignee: Teradata US, Inc., Miamisburg, OH (US)

( * ) Notice: Subject to any disclaimer, the term of this patent is extended or adjusted under 35 U.S.C. 154(b) by 976 days.

(21) Appl. No.: 10/016,452

(22) Filed: Dec. 10, 2001

Related U.S. Application Data (63) Continuation-in-part of application No. 09/845,461, filed on Apr. 30, 2001, and a continuation-in-part of application No. 09/845,924, filed on Apr. 30, 2001, and a continuation-in-part of application No. 09/845,851, filed on Apr. 30, 2001, and a continuation-in-part of application No. 09/608,355, filed on Jun. 29, 2000, and a continuation-in-part of application No. 09/610,646, filed on Jun. 29, 2000, and a continuation-in-part of application No. 09/608,681, filed on Jun. 29, 2000, and a continuation-in-part of application No. 09/608,675, filed on Jun. 29, 2000, and a continuation-in-part of application No. 09/608,342, filed on Jun. 29, 2000, and a continuation-in-part of application No. 09/608,682, filed on Jun. 29, 2000.

(51) Int. Cl.
    G06Q 40/00 (2006.01)
(52) U.S. Cl. ....................................................... 705/35
(58) Field of Classification Search .................. 705/35, 705/1, 8, 30, 36 T, 38
    See application file for complete search history.

(56) References Cited

U.S. PATENT DOCUMENTS

| | | | | |
|---|---|---|---|---|
| 4,091,448 | A | * | 5/1978 | Clausing ..................... 235/379 |
| 4,114,027 | A | * | 9/1978 | Slater et al. .................. 705/43 |
| 4,642,767 | A | * | 2/1987 | Lerner ......................... 705/30 |
| 5,048,104 | A | * | 9/1991 | D'Aoust et al. ............ 382/293 |
| 5,131,071 | A | * | 7/1992 | Tsutsumi et al. .............. 706/4 |
| 5,189,608 | A | | 2/1993 | Lyons et al. |
| 5,249,120 | A | | 9/1993 | Foley |
| 5,317,504 | A | * | 5/1994 | Nakayama ................... 705/30 |
| 5,495,574 | A | * | 2/1996 | Miyazawa et al. ............. 706/4 |
| 5,497,449 | A | * | 3/1996 | Miyazawa ................... 706/52 |
| 5,615,109 | A | | 3/1997 | Eder |

(Continued)

OTHER PUBLICATIONS

Price et al., "College Accounting", Glencoe Macmillan/McGraw-Hill, Seventh Edition, 1994, pp. 28-41, 529-531, 966-982.*

(Continued)

*Primary Examiner*—Andrew Joseph Rudy
(74) *Attorney, Agent, or Firm*—Gates & Cooper, LLP (57) ABSTRACT

A Value Analyzer system is a data-driven computer-facilitated financial model that provides accurate and consistent profitability calculations using account and event data stored in a relational database managed by a relational database management system (RDBMS), wherein the account data comprises attributes of the accounts being measured and the event data comprises attributes of account-related transactions. A selector function uses selection criteria to select accounts and events from the relational database in order to generate a number of inputs for profitability calculations.

6 Claims, 4 Drawing Sheets

U.S. PATENT DOCUMENTS

| | | | |
|---|---|---|---|
| 5,655,085 A | | 8/1997 | Ryan et al. |
| 5,712,987 A | | 1/1998 | Waits et al. |
| 5,721,831 A | | 2/1998 | Waits et al. |
| 5,790,755 A | * | 8/1998 | Pagni et al. .................... 706/4 |
| 5,808,697 A | * | 9/1998 | Fujimura et al. ........... 348/672 |
| 5,819,237 A | | 10/1998 | Garman |
| 5,911,135 A | | 6/1999 | Atkins |
| 5,991,743 A | | 11/1999 | Irving et al. |
| 6,012,047 A | * | 1/2000 | Mazonas et al. ............... 705/38 |
| 6,018,722 A | * | 1/2000 | Ray et al. ................. 705/36 R |
| 6,026,382 A | | 2/2000 | Kalthoff |
| 6,085,175 A | | 7/2000 | Gugel et al. |
| 6,233,566 B1 | | 5/2001 | Levine et al. |
| 6,240,399 B1 | | 5/2001 | Frank et al. |
| 6,253,192 B1 | | 6/2001 | Corlett et al. |
| 6,275,813 B1 | | 8/2001 | Berka |
| 6,292,787 B1 | | 9/2001 | Scott et al. |
| 6,324,523 B1 | * | 11/2001 | Killeen et al. ................ 705/35 |
| 6,360,210 B1 | | 3/2002 | Wallman |
| 6,370,266 B1 | * | 4/2002 | Lau et al. ................... 382/137 |
| 6,393,406 B1 | | 5/2002 | Eder |
| 6,499,023 B1 | * | 12/2002 | Dong et al. ................... 706/46 |
| 6,542,905 B1 | * | 4/2003 | Fogel et al. ................ 707/200 |
| 7,050,997 B1 | * | 5/2006 | Wood, Jr. ................. 705/36 R |
| 2002/0026394 A1 | | 2/2002 | Savage et al. |

OTHER PUBLICATIONS

Ainsworth et al., "Introduction to Accounting: An Integrated Approach", Preliminary Edition, 1996, vol. 2, chapter 22.*

John R. Johnson, Raising Relationships, Bank Marketing, Jun. 1999, pp. 16-24.*

John R. Johnson, Raising Relationships, Bank Marketing, Jun. 1999, pp. 30-36, footnote 1.*

Curley, Bob, "Royal Bank unearths profitability solution", Bank Systems & Technology, Apr. 2000, 2 pages.

Kassing, Jay, "Profitability: Growing the Bottom Line," CSI, 1999, 43 pp.

"Canadian Bank Mines for Data-based Gold," Action Items, Dec. 2, 1997, 2 pp.

"Bank of Ireland Selects Compaq AlphaServers to Help Improve Profitability Management," Dec. 3, 1998, Compaq, 2 pp.

"Marquis Tops 300 MCIF-CRM Data Mart Clients Worldwide," Apr. 18, 2000, 2 pp.

Middleton, Arthur, "How Profitability Analysis is Used in Financial Services Marketing, " date unknown, 3 pp.

\* cited by examiner

DYNAMIC EVENT SELECTION FOR FINANCIAL PROCESSING IN A RELATIONAL DATABASE MANAGEMENT SYSTEM

CROSS REFERENCE TO RELATED APPLICATIONS

This application is a continuation-in-part of the following co-pending and commonly assigned patent applications:

Application Ser. No. 10/016,779, entitled "PARALLEL SELECTION PROCESSING FOR FINANCIAL PROCESSING IN A RELATIONAL DATABASE MANAGEMENT SYSTEM," filed on Dec. 10, 2001, by Brian Wasserman;

Application Ser. No. 10/013,422, entitled "ACCOUNT SELECTION FOR FINANCIAL PROCESSING IN A RELATIONAL DATABASE MANAGEMENT SYSTEM," filed on Dec. 10, 2001 by Brian Wasserman;

Application Ser. No. 10/013,434, entitled "DRIVER AMOUNT AND COUNT SELECTION FOR FINANCIAL PROCESSING IN A RELATIONAL DATABASE MANAGEMENT SYSTEM," filed on Dec. 10, 2001, by Brian Wasserman;

Application Ser. No. 09/845,461, entitled "TAX ADJUSTMENT FOR FINANCIAL PROCESSING IN A RELATIONAL DATABASE MANAGEMENT SYSTEM," filed on Apr. 30, 2001, by George Robert Hood;

Application Ser. No. 09/845,924, entitled "AMORTIZATION FOR FINANCIAL PROCESSING IN A RELATIONAL DATABASE MANAGEMENT SYSTEM," filed on Apr. 30, 2001, by George Robert Hood;

Application Ser. No. 09/845,851, entitled "SHAREHOLDER VALUE ADD FOR FINANCIAL PROCESSING IN A RELATIONAL DATABASE MANAGEMENT SYSTEM," filed on Apr. 30, 2001, by George Robert Hood;

Application Ser. No. 09/608,355, entitled "ADVANCED AND BREAKTHROUGH NET INTEREST REVENUE IMPLEMENTATION FOR FINANCIAL PROCESSING IN A RELATIONAL DATABASE MANAGEMENT SYSTEM," filed on Jun. 29, 2000, by George Robert Hood and Paul H. Phibbs, Jr.;

Application Ser. No. 09/610,646, entitled "BASIC AND INTERMEDIATE NET INTEREST REVENUE IMPLEMENTATION FOR FINANCIAL PROCESSING IN A RELATIONAL DATABASE MANAGEMENT SYSTEM," filed on Jun. 29, 2000, by George Robert Hood and Paul H. Phibbs, Jr.;

Application Ser. No. 09/608,681, entitled "OTHER REVENUE IMPLEMENTATION FOR FINANCIAL PROCESSING IN A RELATIONAL DATABASE MANAGEMENT SYSTEM," filed on Jun. 29, 2000, by George Robert Hood;

Application Ser. No. 09/608,675, entitled "DIRECT EXPENSE IMPLEMENTATION FOR FINANCIAL PROCESSING IN A RELATIONAL DATABASE MANAGEMENT SYSTEM," filed on Jun. 29, 2000, by George Robert Hood;

Application Ser. No. 09/608,342, entitled "INDIRECT EXPENSE IMPLEMENTATION FOR FINANCIAL PROCESSING IN A RELATIONAL DATABASE MANAGEMENT SYSTEM," filed on Jun. 29, 2000, by George Robert Hood; and Application Ser. No. 09/608,682, entitled "RISK PROVISION IMPLEMENTATION FOR FINANCIAL PROCESSING IN A RELATIONAL DATABASE MANAGEMENT SYSTEM," filed on Jun. 29, 2000, by George Robert Hood;

all of which applications are incorporated by reference herein.

BACKGROUND OF THE INVENTION

1. Field of the Invention

This invention relates in general to financial processing systems performed by computers, and in particular, to the implementation of parallel selection processing for financial processing using data accessed from a relational database management system.

2. Description of Related Art

Financial processing systems provide tools for financial analysis of accounting data. Typically, each financial processing system operates in a unique way and approaches financial analysis differently. Some financial processing systems are advanced in their approach to profitability calculations, and others are still at a more basic level. In addition, there is no agreement as to the rules for profitability calculations, outside of generally accepted accounting policies that external auditors use.

Yet, the majority of financial processing systems are inefficient in their accessing of relational databases. There is a need, then, for an improved approach to selecting account and event data from a relational database, especially in the area of parallel processing.

SUMMARY OF THE INVENTION

A Value Analyzer system is a data-driven computer-facilitated financial model that provides accurate and consistent profitability calculations using account and event data stored in a relational database managed by a relational database management system (RDBMS), wherein the account data comprises attributes of the accounts being measured and the event data comprises attributes of account-related transactions. A selector function uses selection criteria to select accounts and events from the relational database in order to generate a number of inputs for profitability calculations.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

A Value Analyzer system is a data-driven computer-facilitated financial model that provides accurate and consistent profitability calculations using account and event data stored in a relational database managed by a relational database management system (RDBMS), wherein the account data comprises attributes of the accounts being measured and the event data comprises attributes of account-related transactions. A selector function uses selection criteria to select accounts and events from the relational database in order to generate a number of inputs for profitability calculations.

Hardware and Software Environment

Figure 1:
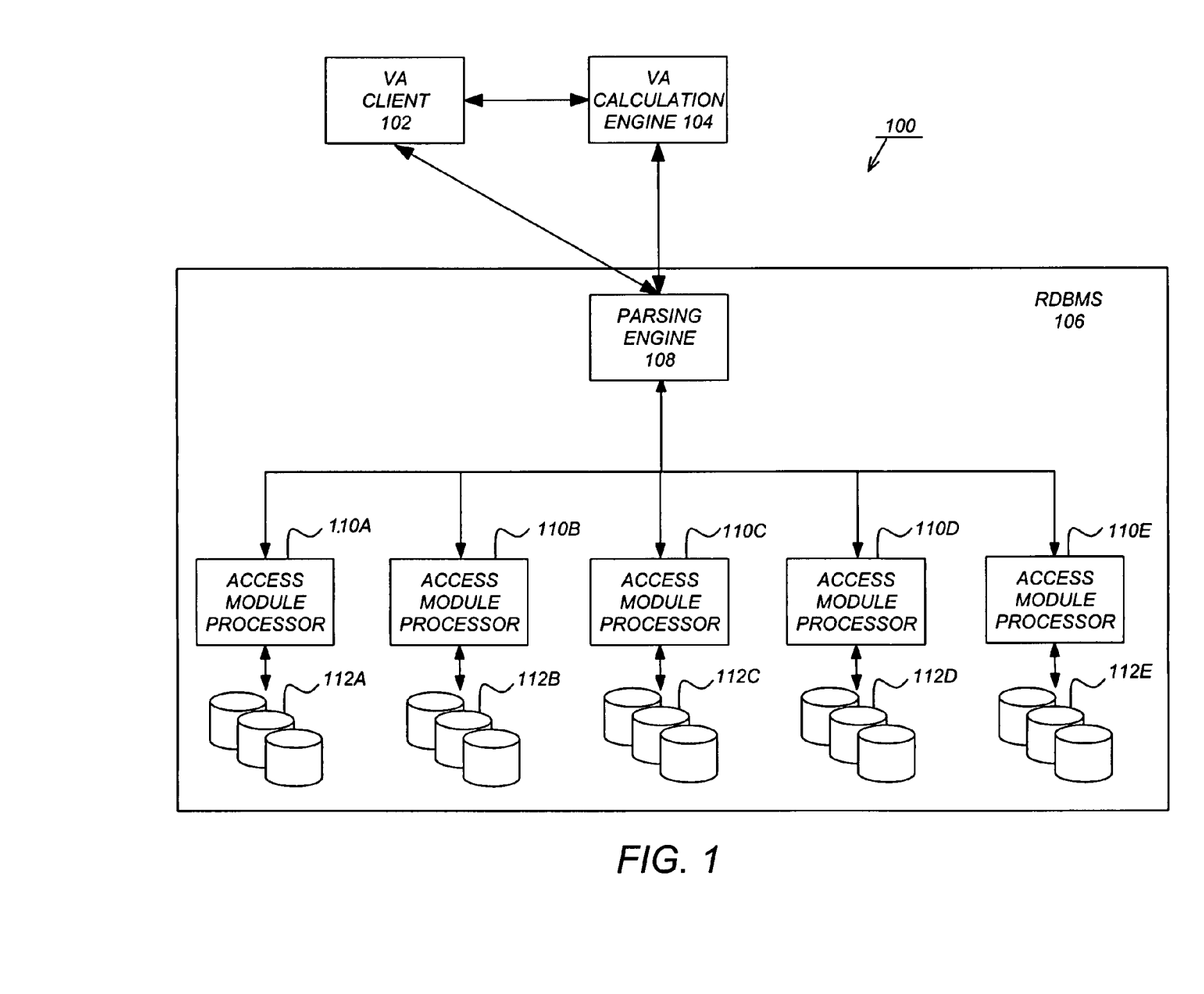
FIG. 1 illustrates an exemplary hardware and software environment according to the preferred embodiment of the present invention.

FIG. 1 illustrates an exemplary hardware and software environment according to the preferred embodiment of the present invention. In the exemplary environment, a computer system 100 implements a financial processing system, known as the Value Analyzer system, in a three-tier client-server architecture, wherein the first or client tier provides a Value Analyzer Client 102 that may include, inter alia, a graphical user interface (GUI), the second or middle tier provides a Value Analyzer Calculation Engine 104 for performing functions as described later in this application, and the third or server tier comprises a Relational DataBase Management System (RDBMS) 106 that stores data and metadata in a relational database. The first, second, and third tiers may be implemented in separate machines, or may be implemented as separate or related processes in a single machine.

In the preferred embodiment, the RDBMS 106 includes at least one Parsing Engine (PE) 108 and one or more Access Module Processors (AMPs) 110A-110E storing the relational database in one or more data storage devices 112A-112E. The Parsing Engine 108 and Access Module Processors 110 may be implemented in separate machines, or may be implemented as separate or related processes in a single machine. The RDBMS 106 used in the preferred embodiment comprises the Teradata® RDBMS sold by NCR Corporation, the assignee of the present invention, although other DBMS's could be used.

Generally, the Value Analyzer Client 102 includes a graphical user interface (GUI) for operators of the system 100, wherein requests are transmitted to the Value Analyzer Calculation Engine 104 and/or the RDBMS 106, and responses are received therefrom. In response to the requests, the Value Analyzer Calculation Engine 104 performs the functions described below, including formulating queries for the RDBMS 106 and processing data retrieved from the RDBMS 106. Moreover, the results from the functions performed by the Value Analyzer Calculation Engine 104 may be provided directly to the Value Analyzer Client 102 or may be provided to the RDBMS 106 for storing into the relational database. Once stored in the relational database, the results from the functions performed by the Value Analyzer Calculation Engine 104 may be independently retrieved from the RDBMS 106 by the Value Analyzer Client 102.

Note that the Value Analyzer Client 102, the Value Analyzer Calculation Engine 104, and the RDBMS 106 may be implemented in separate machines, or may be implemented as separate or related processes in a single machine. Moreover, in the preferred embodiment, the system 100 may use any number of different parallelism mechanisms to take advantage of the parallelism offered by the multiple tier architecture, the client-server structure of the Value Analyzer Client 102, Value Analyzer Calculation Engine 104, and RDBMS 106, and the multiple Access Module Processors 110 of the RDBMS 106. Further, data within the relational database may be partitioned across multiple data storage devices 112 to provide additional parallelism.

Generally, the Value Analyzer Client 102, Value Analyzer Calculation Engine 104, RDBMS 106, Parsing Engine 108, and/or Access Module Processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Value Analyzer Operation

The Value Analyzer system is a data-driven computer-facilitated financial model that provides accurate and consistent profitability calculations using account, event and organization data stored in the RDBMS 106, wherein: (1) the account attributes comprise data about accounts being measured, (2) the event attributes comprise data about account-related transactions, and (3) the organization attributes comprise data about the organization's financial status. The profitability calculations performed by the Value Analyzer system rely on a Five Factor Atomic Profit Metric (FFAPM):

$$\begin{aligned}\text{Profit} = &\ \text{Net Interest Revenue (NIR)} \\ &+ \text{Other Revenue (OR)} \\ &- \text{Direct Expense (DE)} \\ &- \text{Indirect Expense (IE)} \\ &- \text{Risk Provision (RP)} \\ = &\ \text{NIR} + \text{OR} - \text{DE} - \text{IE} - \text{RP}\end{aligned}$$

In the above equation, it is assumed that the sign of elements that reduce profit are negative and those that contribute are positive.

Each of the five factors of FFAPM are defined below:
Net Interest Revenue. This component comprises interest revenue, and is the largest component of profitability (e.g., from loans, deposits, cash, etc.).
Other Revenue. This component comprises non-interest revenue (e.g., fees and commissions), including those driven by events (e.g., open account, excessive counter withdrawals, early payout penalties, etc.).
Direct Expense. This component comprises expenses driven by events that are attributable to accounts.
Indirect Expense. This component comprises expenses that are not attributable to specific accounts. This includes expenses that relate to the cost of doing business that are not driven by account or event activity, such as those that arise from overheads, inefficiencies or differences between standard and actual costs (e.g., the CEO's salary, etc.).

Risk Provision. This component comprises the expected cost of risks that arise from the uncertainties of doing business, e.g., market risks, customer credit, competition, operations, regulatory risks, political risks, etc.

Each of these five factors can be measured for a desired period (daily, weekly, monthly, quarterly, etc.). Moreover, each factor is essentially discrete and independent with fundamentally different characteristics, which strengthens the user's ability to fully utilize the output to determine relationships between account, event and organization data, and enable consistent multiple dimensional aggregation.

The FFAPM is "atomic" in that profitability is computed using data stored in the RDBMS 106. There are three aspects to this:

- components of profitability may be measured below the account level (at events which make up account activity over an accounting period) and accumulated to the account,
- components of profitability may be measured directly at the account level (such as interest paid or earned for an accounting period),
- components of profitability may be known, obtained, or aggregated at a higher level, and may be apportioned down to specific accounts and events according to various rules.

The Value Analyzer generally defines "indirect" components of profitability to be those which must be apportioned to accounts and "direct" components to be those which are either computed at the account level, or are rolled up to the account level from lower level events.

Value Analyzer Data Flow

Figure 2:
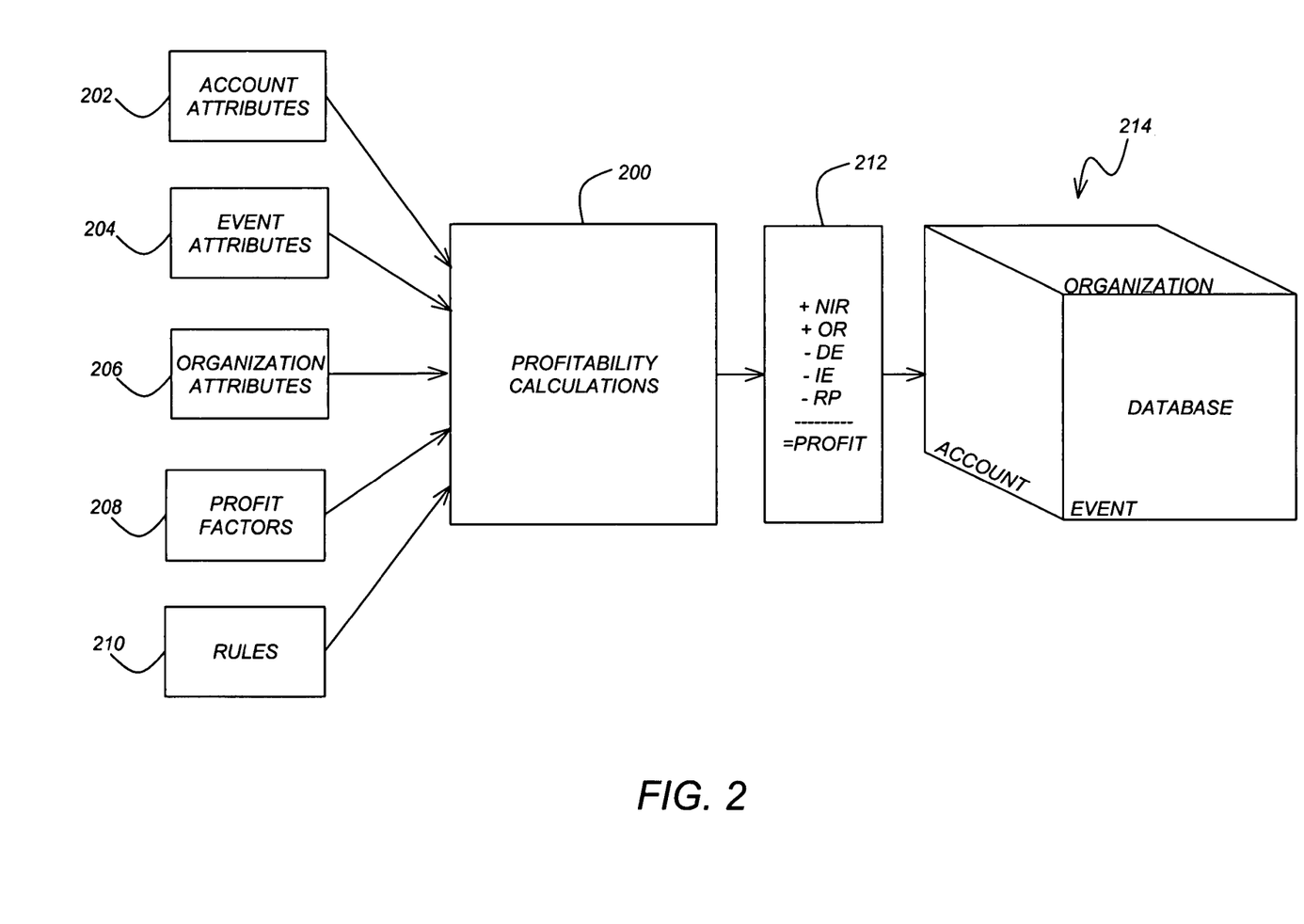
FIG. 2 is a data flow diagram that illustrates the operation of the Value Analyzer according to the preferred embodiment of the present invention.

FIG. 2 is a data flow diagram that illustrates the operation of the Value Analyzer system according to the preferred embodiment of the present invention. Within the Value Analyzer Calculation Engine 104, one or more Profitability Calculations 200 accept a number of inputs including Account Attributes 202, Event Attributes 204, Organization Attributes 206, and Profit Factors 208. Thereafter, the Profitability Calculations 200 invoke one or more Rules 210 that generate the FFAPM 212, which in turn are used to create the Database 212. The Database 212 may be represented along account, event, or organization dimensions, or along other dimensions as may be required. These elements are described in more detail below.

Input Definitions

Account Attributes 202 comprise data about the accounts being measured. This data includes: balance, rate (or interest accrued), product identification, limits, expected default frequency, and various dates (e.g., open, rate reset, last payment, next payment, maturity, etc.).

Event Attributes 204 comprise data about account-related events or transactions. This data includes: account identification, event or transaction amounts, event or transaction location, event or transaction time, counter-party identification, event or transaction type (e.g., loan payment, interest paid, loan draw down amount, etc.).

Organization Attributes 206 comprise data about the financial status of the organization. This data includes: balance sheet and profit statement amounts aggregated by the legal or management entities that own the account base being measured.

Profit Factors 208 include parameter values necessary to perform the Profitability Calculations 200. The major classifications of this data include:

Funds transfer rates are pricing methods that require matched maturity opportunity rates for use in valuing each account's marginal use or source of internal funds.

Unit costs are used for Direct Expense calculations, where a total cost is provided as an Organization Attribute 206 and the Unit Cost is then derived by dividing total cost by actual volume. Unit Costs can be either standard, actual, or market, and ideally represent marginal values (if "fully absorbed measures" are used, then the usefulness of allocated amounts is diminished.)

Allocated amounts are used in both Other Revenue and Indirect Expense calculations, wherein the allocated amounts are apportioned amongst all accounts in a group.

Miscellaneous calculation values may comprise, for example, the number of days in a profit measurement period, an equity allocation weighting, etc. These values are known as "modeling" parameters.

Amortization parameters are used in interest amortization, which requires interest rates and life values used by straight-line amortization and by declining balance of amortization.

Risk measurement parameters are used in Risk Provision calculations, which require various factors, such as: loss rates, reserve percentages, exposure factors, recovery rates, default probabilities and collection costs.

Tax rates are required for after-tax profit calculation. The Value Analyzer is designed to calculate pre-tax income on a taxable equivalent basis (where an effective tax rate is all that is required to transform pre-tax income into after tax earnings, i.e., Profit).

Rules

The Profitability Calculations 200 use one or more Rules 210 applied to data retrieved from the RDBMS 106. These Rules 210 include, inter alia, the following:

Treatments. Every account with cash flows affecting a organization's balance sheet requires a method of valuing the account's use of internal funds. One approach is "matched maturity funds transfer pricing," which uses a canonical representation of an account's funding characteristics and then determines a value based on adjusted market yields for each instance that requires an interest rate transfer price to calculate an account's marginal Net Interest Revenue.

Equity Allocation. In order to provide precise Net Interest Revenue calculations, the amount of equity funds required at an account must be determined. This rule allows for equity allocation using any of the following methods: simple ratios; regulatory definitions; economic allocations, or user defined allocations.

Apportionment. Other Revenue, Risk Provision and Indirect Expense calculations are applied at the account level using Organization Attributes 206 that are not related directly to account activity. These profit adjustments are made so that the sum of all account-level Profitability Calculations 200 comprises the overall profit. One approach is to pool indirect costs and revenues and then apportion them. Apportionment rules specify how the pooled indirect costs and revenues is completely allocated to appropriate accounts, wherein the preferred embodiment uses closed form allocation rules, which require only information known in the current period and not iterative computation.

Amortization. Some types of income or expense are deferred or accrued over multiple periods, including and subsequent to the current accounting period. This is common to accrual accounting methods used in profit presentations of financial statements, and gives rise to timing differences between cash flows and their related profit as presented in a financial statement in any accounting period. Since the Value Analyzer system is designed to reconcile to the financial statement's profit values, it supports deferral and accrual accounting principles. Amortization methods that account for these timing differences are: interest amortization (used for interest income and expense accruals and for deferral of fees that are in lieu of interest), and straight line or declining balance amortizations (used for cost deferrals and investment depreciation).

Other Revenue Pricing. In situations where account and event activity can be used to derive account level income or fees, the Value Analyzer system calculates these drivers of the profitability in the Other Revenue calculations. These calculations comprise linear combinations of event or account values and modeled coefficients.

Direct Expense. The calculation of account profit adjustments due to account-related activity requires rules that take the form of linear combinations of event or account values and modeled coefficients.

Indirect Expense. In situations where expense apportionment or amortization amounts are aggregated, the user may want different rules applied depending on the path (or dimension) of aggregation. These rules allow for multiple Profitability Calculations rules to be applied to derive multiple account level Indirect Expense amounts.

Risk Provision. Adjusting current profit for expected future losses is known as "actuarial" profit provisioning. The Value Analyzer system applies actuarial-based methods in its account level Profitability Calculations, where the actuarial reserve that the provisions maintain represents the expected loss associated with all accounts.

Taxable Equivalent Gross-up. Profit is an after-tax measure, and thus some events or portions of some accounts' profits may be excluded from normal taxation. The Value Analyzer system adjusts these pre-tax values, so that a singular tax rate can be used to convert pre-tax profit into after-tax values, which are also known as taxable equivalent adjustment. These rules use account and event attributes to adjust each of the five factors of the FFAPM to a taxable equivalent basis.

Interest Yield Adjustments. Since the Value Analyzer system can calculate profits for any number of periods, the adjustment of cash interest payments, and the financial statement's accrual or smoothed representation of interest-related Profit, the Value Analyzer system provides a method for converting cash interest amounts to accrual amounts for financial statements. The Value Analyzer system implements an "effective interest rate" conversion to accomplish this type of calculation.

Profitability Calculations

The following describes the method used by the Profitability Calculations 200:

1. Retrieve data from the RDBMS 106.
2. Calculate Net Interest Revenue for every account.
3. Calculate Other Revenue for every account.
4. Calculate Direct Expense for every account.
5. Calculate Indirect Expense for every account.
6. Calculate Risk Provision for every account.
7. Calculate Profit for every account.
8. Store the FFAPM Profit and the five factors of FFAPM into the RDBMS 106.
9. Aggregate and/or re-calculate the FFAPM Profit and the five factors of FFAPM as necessary.

Note that steps 2 through 6 perform account-level calculations. Steps 2, 3, 4, 5, and 6 can be performed independently and in parallel, while step 7 requires values derived in steps 2, 3, 4, 5, and 6, and therefore must be performed after steps 2, 3, 4, 5, and 6 are completed.

Output Definition

The Profitability Calculations 200 generate one or more values for the five factors of the FFAPM 210, and specifically, the NIR, OR, DE, IE, RP, and Profit values. These values are used to generate the output data 214, which can be stored by the RDBMS 106 in the relational database.

Parallel Processing of a Selector Function

Figure 3:
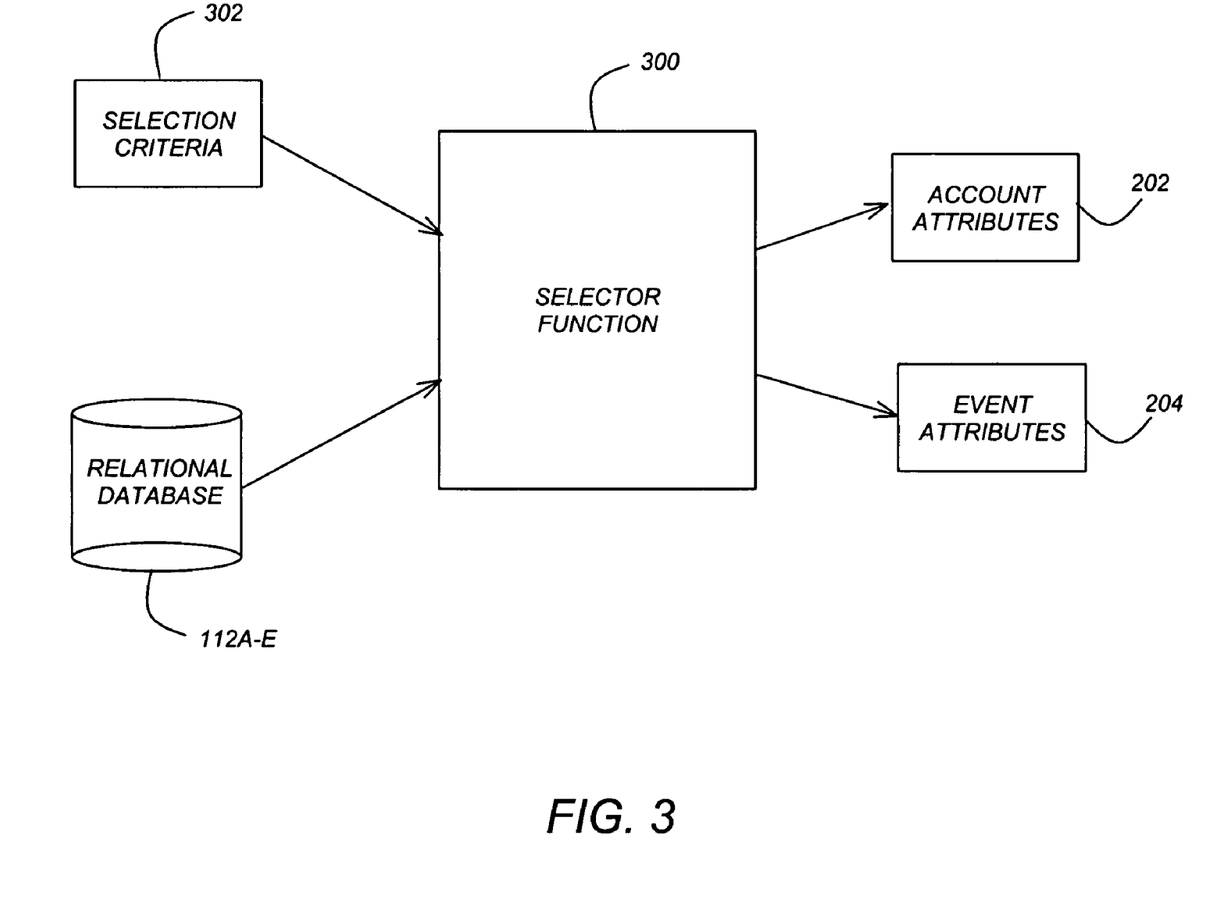
FIG. 3 illustrates a selector function included in a Value Analyzer system according to the preferred embodiment of the present invention.

FIG. 3 illustrates a Selector function 300 included in the Value Analyzer system according to the preferred embodiment of the present invention. Within the Value Analyzer Calculation Engine 104, the Selector function 300 selects accounts and events from the relational database managed by the RDBMS 106 in order to generate a number of inputs for the Profitability Calculations 200, including Account Attributes 202 and Event Attributes 204. Because of the limited amount of data associated with the Organization Attributes 206 and Profit Factors 208, these inputs to the Profitability Calculations 200 do not require the capabilities of the Selector function 300, although the Selector function 300 could be used with these inputs as well.

Selection Criteria

In the Value Analyzer system, the Selector function 300 uses one or more sets of Selection Criteria 302 to determine which accounts and events should be processed. In the preferred embodiment, the following types of Selection Criteria 302 may be used:

Product Groups;
Balance Types;
Account Event Groups;
Master Account Event Groups;
Account Attributes; and
Master Account Attributes.

Other types of Selection Criteria 302 may be used as well.

The Selection Criteria 302 may comprise attributes, predicates, operators and/or functions, wherein a group of accounts or events that satisfy the Selection Criteria 302 comprise partitions. For example, it is possible to compare an account attribute (i.e., a column) to another account attribute, a literal value, or a domain value (which is an indirect reference to a literal value that is resolved by a lookup function). Operators may include any number of different relational operators, i.e., $=$, $>=$, $<=$, $<$, $>$, BETWEEN, etc., and functions may comprise aggregate or other functions.

The Selection Criteria 302 may also include dynamic event attributes. For example, multiple event attributes may be defined for each account. The event attribute definition can vary both in the number of event attributes used to identify account events, and in the identity of the event attributes. This means that the selection of accounts having specific combinations of event attributes is dynamic, rather than static.

Source Target and Driver Components

In the Value Analyzer system, each rule performed by the Profitability Calculation 200 can include multiple sets of Selection Criteria 302. Specifically, each rule performed by the Profitability Calculation 200 is comprised of Source, Target and Driver components, and each of these components can have Selection Criteria 302. In this context, a Source component is a source of funds to be allocated, a Target component is a target of funds to be allocated, and a Driver component is an attribute or function that controls the allocation of funds from the source to the target (e.g., account attributes, number of accounts, event attributes, event counts, event amounts, etc.). The Selection Criteria 302 for these components can be dynamically specified by the user.

Amounts and Counts

An amount can be specified by the user for the Source component, and both amounts and counts can be specified for Driver components. The specification of amounts or counts, combined with the Selection Criteria 302, requires that the Selector function 300 dynamically select the proper sets of accounts or events, and aggregate the user-specified amounts or counts. Generally, this selection and aggregation will be different from one rule to another, and from one Profitability Calculation 200 to another.

Event Thresholding

The Selector function 300 may use the amounts and counts to perform event thresholding when forming an Event Group. For example, the Selector function 300 may be programmed to only select accounts that have some specified number of some specified combinations of event attributes. Specifically, using the example, the Selector function 300 looks for accounts that meet any of the Selection Criteria 302 specified above, wherein the amount or count of the events is summed to determine whether they meet a user-specified thresholding requirement.

Rule Screening

Once the lists of Selection Criteria 302 have been specified, the next step is to screen the Profitability Calculation 200 rules and Selection Criteria 302. Specifically, any rules or criteria that the Selector function 300 does not need to execute can be removed. For example:

1. If a Profitability Calculation 200 rule is an apportionment rule, and the apportionment amount is $0.

2. If a Profitability Calculation 200 rule does not have any Selection Criteria 302, then the Selector function 300 can skip the rule. This occurs, for example, when a rule is applied to all accounts, i.e., when no Selection Criteria 302 are applied. Note that the rule can be removed only if the Source, Driver, and Target components all lack Selection Criteria 302.

3. If the Selection Criteria 302 are objectively invalid, then the Profitability Calculation 200 rule can be removed. For example, if an account attribute has two equality comparisons to different values, e.g., "Select all accounts where account="checking account," balance=$5000, and balance=$12000, which is objectively invalid, the profitability rule can be removed (with an error message displayed).

Operation

Using the Selection Criteria 302 for each of the components, the Selector function 300 dynamically generates SQL statements to select the proper accounts and events from an account table and event log table in the relational database. The account table contains all of the accounts at a financial institution, and the event log table contains all of the account events or transactions that occurred during a specified period at the financial institution.

The Selector function 300 can perform parallel processing of the Selection Criteria 302, which allows the Selector function 300 to optimize the selection of accounts and events. Using this process, similar Selection Criteria 302 are grouped together and processed independently and in parallel by the RDBMS 106, and the results therefrom are stored in temporary work tables.

The Selector function 300 uses one or more parameterized templates to dynamically generate the SQL statements. This parameterized template typically comprises a join of (potentially) multiple tables within the relational database to a constraint table (storing the Selection Criteria 302) and an in-list table (storing IN clauses for the SQL templates). Both the constraint and in-list tables are created and populated from the Selection Criteria 302.

Specifically, there are several very important steps in generating the SQL statements:

1. Substantially similar Selection Criteria 302 are grouped in order to combine them into one account-partitioning set of SQL statements. In this context, "similar" does not necessarily mean identical, e.g., certain Selection Criteria 302 are considered identical for the grouping function and are later altered to match the original SQL statements.

2. Once the Selection Criteria 302 are grouped, it is necessary to convert and/or combine some of the Selection Criteria 302 in order to ensure that every Selection Criteria 302 can be expressed in the fewest number of templates.

3. One or more constraint tables are created and populated for each group of Selection Criteria 302.

4. One or more in-list tables are created and populated for all groups of Selection Criteria 302.

Standardizing Selection Criteria

For the purpose of grouping Selection Criteria 302, the Selector function 300 treats the relational operators, e.g., =, <, >, →, <=, as equivalent to a BETWEEN operation. In fact, the Selector function 300 converts these relational operators into an equivalent BETWEEN operation according to the mappings in the following table:

| Operator | Maps to | Left Value | AND | Right Value |
|---|---|---|---|---|
| =X | Maps to BETWEEN | X | AND | X |
| <X | Maps to BETWEEN | MIN | AND | LOWER(X) |
| <=X | Maps to BETWEEN | MIN(X) | AND | X |
| >X | Maps to BETWEEN | HIGHER(X) | AND | MAX(X) |
| >=X | Maps to BETWEEN | X | AND | MAX(X) | wherein:

MAX(X) is the maximum value of X in the domain of its data type. For example, if X is a BYTEINT value, then the maximum value of X is 127.

MIN(X) is the minimum value of X in the domain of its data type. For example, if X is a BYTEINT value, then the minimum value of X is −128.

LOWER(X) is the next lowest value of X in the domain of its data type. For example, if X is a BYTEINT value, then the next lower value of X is 'X−1' (unless X is already −128).

HIGHER(X) is the next greater value of X in the domain of its data type. For example, if X is a BYTEINT value, then the next greater value of X is 'X+1' (unless X is already 127).

If the relational operator in the Selection Criteria 302 is of the type '>=', '<=', '>', or '<', then there may exist another Selection Criteria 302 within the group of Selection Criteria 302 that matches, i.e., that would form a valid BETWEEN operation. To match first and second Selection Criteria 302, the first and second Selection Criteria 302 must be the same attribute, and if the relational operator of the first Selection Criteria 302 is either '>=' or '>', then it will match either '<=' or '<' in the second Selection Criteria 302. Likewise, if the relational operator of the first Selection Criteria 302 is '<=' or '<', then it will match either '>=' or '>' in the second Selection Criteria 302.

Once a matching pair of first and second Selection Criteria 302 is found, the combination into one BETWEEN operation is straightforward. It is worth noting that, just as in the simple case, '<X' results in 'BETWEEN Y AND LOWER(X)' and '>X' results in 'BETWEEN HIGHER(X) and Y'.

Grouping Selection Criteria

The Selector function 300 optimizes the dynamic generation of SQL statements, so that multiple Selection Criteria 302 can be processed in parallel by the RDBMS 106. Generally, this requires an understanding of the operation of the Parsing Engine 108 of the RDBMS 106, and how it transforms SQL statements into an operator tree that, in turn, can be used to generating multiple, parallelized access plans for execution by Access Module Processors 110A-E of the RDBMS 106.

In generating the SQL statements, the Selector function 300 groups multiple sets of Selection Criteria 302 together and processes the groups in parallel to the extent possible, and generates several sets of output tables. The goal is to process similar selection predicates together at the same time, so that fewer passes need to be made through the tables in the relational database. In a final pass, these output tables are filtered and combined to produce the correct sets for each source, target, and driver in the Profitability Calculation 200 rules.

This step is necessary because the Profitability Calculations 200 are scripts that operate against known, statically defined, tables. In the Value Analyzer system, the specification of Selection Criteria 302, and the attributes that can be used in the selection process, are completely dynamic and user-driven. There is no way for the scripts to contain this knowledge, nor can it be predefined as part of the scripts. The dynamic nature of the profitability rules using the Selector function is a core feature of the Value Analyzer system, and is one of the key competitive advantages that differentiates the Value Analyzer system from other profitability solutions.

When grouping Selection Criteria 302, the following is required:

1. The Selection Criteria 302 has to be applied to the same level of accounts.

2. That each of the Selection Criteria 302 are of the same types of Selection Criteria 302. For example, if two Selection Criteria 302 include both Product Group and Account Attribute, these can be grouped together. If one of the Selection Criteria 302 includes only Product Group, and the other Selection Criteria 302 includes both Product Group and Account Attribute, then these cannot be grouped together.

3. That each of the Selection Criteria 302 access the same attributes or columns. Note that an alternative embodiment would only require that each of the Selection Criteria 302 access the same table.

Using the above, each distinct group of Selection Criteria 302 can be processed independently. This allows the Selector function 300 to process each distinct group of Selection Criteria 302 in parallel. In this context, a partition is a set of one or more accounts that satisfy one or more Selection Criteria 302, in order to apply costs and revenues to each account.

Output Tables

After the temporary work tables have been created, the Selector function 300 filters and combines the temporary work tables, yielding output tables corresponding to the inputs for the Profitability Calculations 200, namely, the Account Attributes 202 and Event Attributes 204. These output tables include the account partitions for the rule, wherein the account partitions represent the target accounts against which the profitability rules are applied. The output tables are then processed by one or more of the Profitability Calculations 200 in the Value Analyzer Calculation Engine 104 to accomplish a final result.

Logic of the Preferred Embodiment

Figure 4:
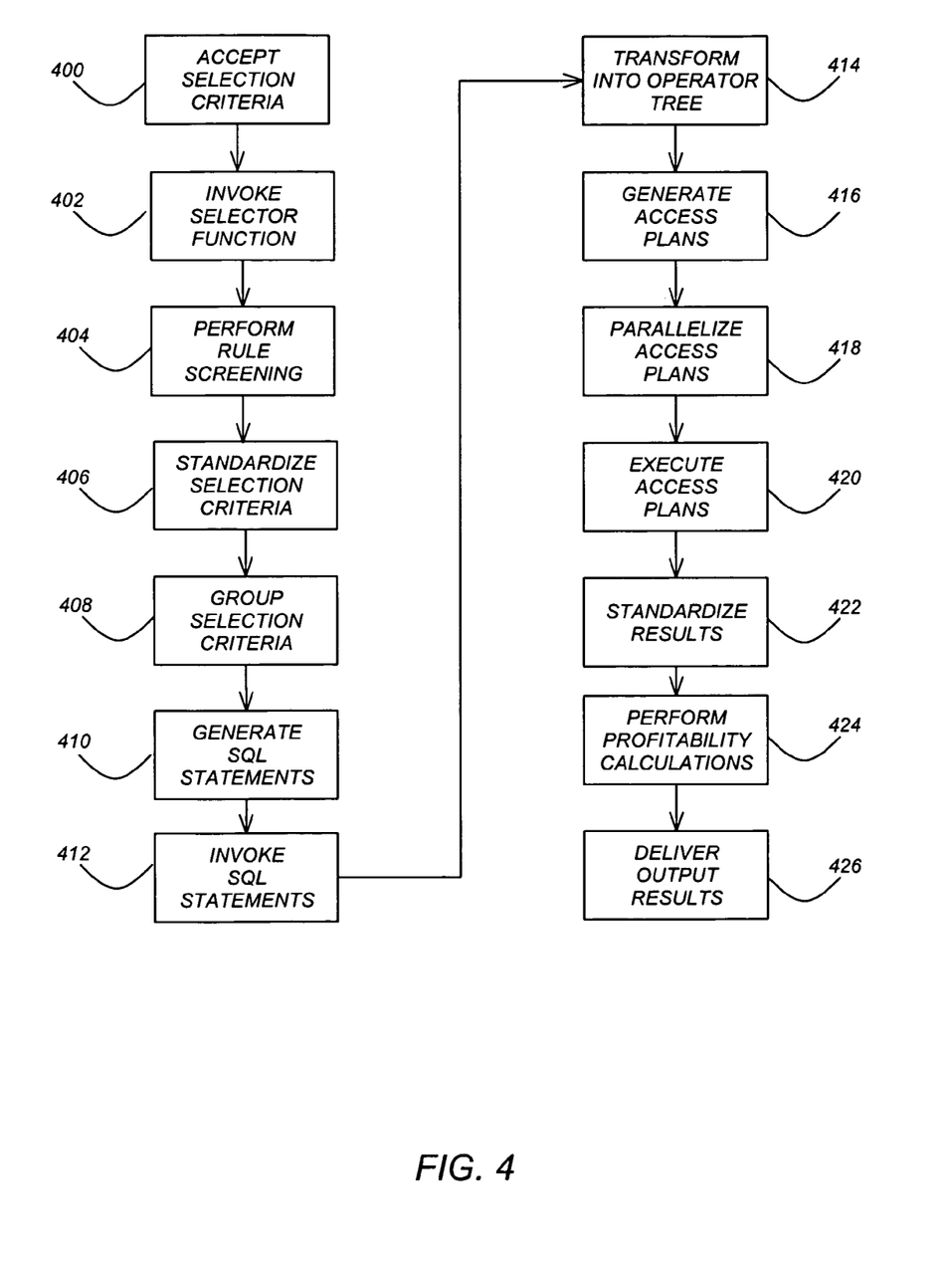
FIG. 4 is a flow chart illustrating the logic of the preferred embodiment of the present invention.

FIG. 4 is a flow chart illustrating the logic of the preferred embodiment of the present invention. Those skilled in the art will recognize that this logic is provided for illustrative purposes only and that different logic may be used to accomplish the same results.

Block 400 represents the Value Analyzer Client 102 accepting one or more Selection Criteria 302 from the user, which may include Selection Criteria 302 for Source, Target and Driver Components, Amounts and Counts, as well as event thresholding values.

Block 402 represents the Value Analyzer Calculation Engine 104 invoking a Selector function 300 for selecting accounts and events from the relational database based on the specified Selection Criteria 302 prior to the execution of the Profitability Calculations 200.

Block 404 represents the Selector function 300 performing rule screening for the selected accounts and events from the relational database based on the specified Selection Criteria 302.

Block 406 represents the Selector function 300 standardizing the Selection Criteria 302.

Block 408 represents the Selector function 302 grouping the standardized Selection Criteria 302.

Block 410 represents the Selector function 300 dynamically generating SQL statements for the selected accounts and events from the relational database based on the specified Selection Criteria 302.

Block 412 represents the Selector function 300 invoking the dynamically generated SQL statements, wherein the SQL statements are transmitted to the RDBMS 106. These SQL statements access account and event attributes from the database managed by the RDBMS 106.

Block 414 represents the Parsing Engine 108 of the RDBMS 106 receiving the SQL statements and transforming the statements into an operator tree.

Block 416 represents the Parsing Engine 108 of the RDBMS 106 generating one or more access plans from the operator tree.

Block 418 represents the Parsing Engine 108 of the RDBMS 106 parallelizing the access plans, and then transmitting the access plans to their assigned Access Module Processors 110A-E of the RDBMS 106.

Block 420 represents the Access Module Processors 110A-E of the RDBMS 106 executing the access plans, and thereby performing the required data manipulation associated with the access plans received from the Parsing Engine 108, wherein the requited data manipulation associated with the access plans are performed in parallel by the Access Module Processors 110A-E.

Block 422 represents the Parsing Engine 108 of the RDBMS 106 standardizing the results received from the Access Module Processors 1110A-E and providing the standardized results to the Value Analyzer Calculation Engine 104 as account and event attributes.

Block 424 represents the Value Analyzer Calculation Engine 104 invoking and performing the Profitability Calculations 200 using the account and event attributes accessed from the RDBMS 106, as well as one or more organization attributes, profit factors and rules.

Block 426 represents the Value Analyzer Calculation Engine 104 delivering the output or results from the Profitability Calculations 200 to the Value Analyzer Client 102 and/or the RDBMS 106. With regard to the Value Analyzer Client 102, the results may be presented to the user, printed, or used by various other computer programs, as desired. With regard to the RDBMS 106, the results may be stored for later use by the Value Analyzer Client 102, the Value Analyzer Calculation Engine 104, or other computer programs, as desired.

CONCLUSION

This concludes the description of the preferred embodiment of the invention. The following paragraphs describe some alternative embodiments for accomplishing the same invention.

In one alternative embodiment, any type of computer or configuration of computers could be used to implement the present invention. In addition, any database management system, decision support system, on-line analytic processing system, or other computer program that performs similar functions could be used with the present invention.

In summary, the present invention discloses a Value Analyzer system, which is a data-driven computer-facilitated financial model that provides accurate and consistent profitability calculations using account and event data stored in a relational database managed by a relational database management system RDBMS), wherein the account data comprises attributes of the accounts being measured and the event data comprises attributes of account-related transactions. A selector function uses selection criteria to select accounts and events from the relational database in order to generate a number of inputs for profitability calculations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing financial processing in a computer, comprising:
   (a) selecting accounts and events from a database through a selector function, wherein the database includes an account table storing the accounts and an event log table scoring the events that occurred for the accounts during a specified period, the selector function uses one or more selection criteria to determine which of the accounts and events should be selected from the database, and the selector function selects the accounts according to one or more specified dynamic event attributes of the selected events that vary both in number and identity; and
   (b) performing one or more profitability calculations in the computer using the accounts and events, wherein the profitability calculations use one or more rules applied to the accounts and events.

2. The method of claim 1, wherein one or more of the dynamic event attributes are defined for each of the accounts.

3. The method of claim 2, wherein a definition for the dynamic event attributes varies both in the number of event attributes and the identity of the event attributes.

4. The method of claim 1, wherein the selector function performs event thresholding when selecting the accounts.

5. The method of claim 4, wherein the selector function only selects accounts that have a specified number of a specified combinations of event attributes.

6. The method of claim 5, wherein the selector function selects the accounts that meet any of the selection criteria, wherein the amount of the events is summed to determine whether they satisfy the event thresholding.

* * * * *